United States Patent

Bamer et al.

[11] Patent Number: 5,820,762
[45] Date of Patent: Oct. 13, 1998

[54] FILTER INSERT FOR A STORM DRAIN

[76] Inventors: Jonathan Michael Bamer, 2836 Chloe Ct., Castro Valley, Calif. 94546; Gregory Stevens Conrad, 505 Kings Canyon Ct., Petaluma, Calif. 94954

[21] Appl. No.: 767,592

[22] Filed: Dec. 14, 1996

Related U.S. Application Data

[63] Continuation-in-part of Ser. No. 491,817, Jun. 20, 1995, abandoned.

[51] Int. Cl.⁶ .................................................. B01D 15/00
[52] U.S. Cl. ........................ 210/661; 210/662; 210/688; 210/690; 210/691; 210/692; 210/693; 210/694; 210/248; 210/255; 210/282; 210/283; 210/284; 210/290; 210/291; 210/163; 210/164; 404/4; 404/5
[58] Field of Search .................................. 404/2, 3, 4, 5; 210/162, 163, 164, 165, 232, 671, 679, 680, 690, 691, 688, 661, 662, 692, 693, 694, 248, 255, 282, 283, 284, 290, 291

[56] References Cited

U.S. PATENT DOCUMENTS

| | | | |
|---|---|---|---|
| 2,182,795 | 12/1939 | Day | 210/164 |
| 4,419,232 | 12/1983 | Arntyr et al. | 210/164 |
| 4,931,139 | 6/1990 | Phillips | 162/100 |
| 5,069,781 | 12/1991 | Wilkes | 210/164 |
| 5,091,245 | 2/1992 | Phillips | 428/221 |
| 5,182,018 | 1/1993 | Langston | 210/282 |
| 5,198,118 | 3/1993 | Heskett | 210/638 |
| 5,223,154 | 6/1993 | MacPherson, Jr. et al. | 210/163 |
| 5,232,587 | 8/1993 | Hegemier et al. | 210/163 |
| 5,264,134 | 11/1993 | McCamy | 210/679 |
| 5,275,943 | 1/1994 | Di Turo | 435/179 |
| 5,284,580 | 2/1994 | Shyh | 210/163 |
| 5,326,703 | 7/1994 | Hazen | 435/262.5 |
| 5,345,741 | 9/1994 | Slater et al. | 210/164 |
| 5,350,527 | 9/1994 | Kitko | 210/804 |
| 5,358,607 | 10/1994 | Ellis | 162/100 |
| 5,372,714 | 12/1994 | Logue, Jr. | 210/164 |
| 5,372,715 | 12/1994 | Maggard et al. | 210/165 |
| 5,376,264 | 12/1994 | Betancourt | 210/166 |
| 5,383,745 | 1/1995 | Shannon | 210/164 |
| 5,397,464 | 3/1995 | Hannon | 210/163 |
| 5,405,539 | 4/1995 | Schneider | 210/163 |
| 5,480,254 | 1/1996 | Autry et al. | 210/163 |

FOREIGN PATENT DOCUMENTS 311803    2/1937    Italy ....................................... 210/164

OTHER PUBLICATIONS

Hydro–Kleen™ Filter System Brochure, two paes, no date..

*Primary Examiner*—Robert Popovics
*Attorney, Agent, or Firm*—Robert Samuel Smith

[57] ABSTRACT

An insert for a storm drain or sanitary sewer inlet such as are found in factory or warehouse floors, parking lots and car washes in which the insert holds one or more bags of filter media. The bags have a very open structure such as coarse weave cotton permitting water entering the drain to pass through each bag and the filter media inside the bag. The entire bag may be conveniently withdrawn from the insert and replaced as the filter media becomes saturated. Preferably, a first bag contains an absorbant cellulose particulate media which absorbs oils and greases and post non-volatile hydrocarbons and a second bag contains specially textured activated carbon which absorbs organically bound heavy metals and volatile hydrocarbons as well other VOCs (volatile organic compounds). Various types of filter media and configurations of these media also allows for the removal of dissolved heavy metals, and even the removal of pathogenic microbes. The insert is constructed to permit withdrawing periodically samples of water for analysis. Another embodiment permits controlled periodic inoculation of the filter media in situ with bioremediating microbes to prolong the life of the filter media.

19 Claims, 4 Drawing Sheets

FILTER INSERT FOR A STORM DRAIN

CROSS REFERENCE TO EARLIER FILED APPLICATIONS

This application is continuation-in-part of earlier field application Ser. No. 08/491,817 filed Jun. 20, 1995, now abandoned for which priority is claimed.

FIELD OF THE INVENTION

This invention relates to purification of water which may be storm runoff, industrial process water or cleaning water from car washes and which pours into drains such as found in parking areas, gas stations, along streets in municipalities and similarly heavily travelled locations. This invention relates particularly to a system that removes hydrocarbon and similar contaminants as well as certain other contaminants such as heavy metals, volatile organic compounds (VOC's) and even harmful microorganisms from water prior to releasing the water into the municipal disposal system or the environment.

PRIOR ART AND INFORMATION DISCLOSURE

Great concern has been generated among the public for ensuring the purity of the domestic water supply in view of the revelation that small traces of contaminants pose a serious threat to public health and particularly children. As a result of this concern, the Clean Water Act (1972) and the Water Quality Act (1987) resulted in establishing the NPDES Program (National Pollutant Discharge Elimination System). The NPDES Program requires permitting in cases of storm water discharges associated with industrial, commercial, municipal, and/or residential activity which may be contaminating run-off water by over-burden, raw material, intermediate product, finished product, by-product or waste product. In addition, many cities, counties, and districts have enacted similar laws. The site of such activities can include large parking facilities where large amounts of run off are generated containing significant amounts of gas and similar anthroprogenic organics as well as heavy metals. Provisions of the program include establishing a monitoring program and instituting Best Management Practice (BMP) to achieve pacticable pollutant reduction.

Numerous techniques have been described for removing contaminants, particularly hydrocarbons including oils, from water.

For example, U.S. Pat. No. 5,350,527 to Kitko features a system including a coarse strainer bag and a fine strainer bag followed by a carbon filter assembly. In constructions of this type where bags are used for straining, the water to be filtered is directed into the open mouth of the bag so that the water drains out of the bottom of the bag. The bag opening is fitted to the opening of the conduit such that replacement of media is a more inconvenient procedure than is contemplated by the present invention.

Various constructions of drains have been disclosed. For example, U.S. Pat. No. 5,376,264 to Betancourt discloses a flat filter disk detachably attached to an annular support by hook and loop material.

U.S. Pat. No. 5,372,715 to Maggard et al discloses a floor drain which prevents debris from entering and clogging drain holes while allowing water to drain.

Enviro-Drain Inc. advertises a drain constructed as a stack of trays containing absorbants. The trays are supported in a frame with a drawrer like construction from which individual trays may be withdrawn for replacing the absorbants as required. The frame is suspended in the drain and pulled out when it is required to replace spent filter material. Filter replacement is more inconvenient than with the present invention.

Numerous disposable absorbent materials have been disclosed which are intended for absorbing waste oils, spillage and the like.

U.S. Pat. No. 5,358,607 to Ellis discloses porous low density shot-like degradable absorbant materials manufactured from cellulosic by-product of the paper pulp industry.

U.S. Pat. No. 5,091,245 to Phillips discloses an absorbent which is characterized by an open porous fiber structure having a low bulk density.

None of these absorbants are suggested for use as filter media in a storm drain.

Another area of technology concerning cleanup of hydrocarbon waste is bioremediation in which specially cultivated microbes are injected into a contaminated area of soil. The microbes degrade the contaminant to a harmless state, ultimately carbon dioxide and water. In other situations, indigenous microbes capable of contaminant degradation are stimulated by enhancing environmental conditions conducive to their growth.

For example, U.S. Pat. No. 5,326,703 to Hazen discloses a method for enhancing mobility of microorganisms by placing an effective amount of chlorinated hydrocarbons in spaced relationship to the microbes so that the microbes are drawn toward a contaminated area.

U.S. Pat. No. 5,275,943 to Di Turo discloses tablets that time release microbes which degrade organic matter such as sewage sludge, hydrocarbons and pesticides.

Yet another area in the development of water treatment media relates to metallic particulates which establish reduction-oxidation conditions which favor oxidation and/or precipitation of metal ions in water thereby removing heavy metals from the water. Such media also reduce agents such as chlorine (to chloride), and electochemically destroy microbes.

For example, U.S. Pat. No. 5,198,118 to Hesket discloses a medium of Cu—Zn particulates. In the context of this specification, such filtering media will be referred to as "redox" media.

According to the present state of the art, treatment of discharge water is a daunting task made more difficult by the requirement of the law to provide frequent test results affirming that the site is being effectively managed. Managing drain sites according to present state of the art practices may be technilogically complex and expensive and is never pleasant. Disposal of the spent filters is a problem.

THE INVENTION

OBJECTS

It is an object of this invention to provide a filter drain for removing contaminants, particularly oils, fuels and other hydrocarbons and pesticides and organically bound inorganics from water that is being discharged from the surroundings into a public water disposal system such as a sanitary sewer or storm drain.

It is another object that the filter drain be for removing contaminants having a wide range of properties including, but not limited to, toxic organics such as VOC's and similar aromatic and volatile compounds; heavy metals (e.g. Pb, Hg, Cr, Cd, etc.); pathogenic or noxious microbes.

It is another object that the filter drain be constructed such that replacement of spent filters is easily accomplished with maximum protection to the operator in terms of cleanliness and personal safety.

It is another object that the spent filter media may be disposable conveniently and economically.

It is another object that the filter drain be constructed to prevent malfunctions such as clogging that might otherwise arise from unforeseen circumstances such as unexpected flooding.

These and other objects will be apparaent from reading the description and studying the drawings.

SUMMARY

This invention is directed toward a multistage filtration system including a support frame that is removably suspended in the opening of a storm drain and which holds one or more open mesh bags of filter media that can be easily replaced as required. Each bag of filter material may be conveniently withdrawn from the support frame one at a time with the filter material retained in the original bag without disturbing the frame so that minimal effort is required by the operator and replacement of the bag can be accomplished with minimal messiness. The particulate size of the various filter media, the size of the mesh of the bags, and the size of the bags are specially selected to ensure effective removal of the contaminats while permitting fast flow of water such as is required in this type of application. In one instance, the bag and the filter material are combustible so that the spent filter material and bag can be conveniently disposed of by incineration. This same media can be buried in a sanitary landfill since it has no significant TCLP. In other cases the media can be regenerated.

The support frame may be constructed from angle iron (or other suitable structural members) to hang from an upper shoulder cast in the top lip of the storm drains. The sides of the support frame may take several forms depending on the size of the drains and volume (or current) of water to be treated. The support frame supports the bags singly or stacked one over another.

In one embodiment, a diffuser screen is positioned at the filter entrance and between each bag. Support for the top difuser is provided with overflow ports to prevent flooding from excessive rates of water flow. A variation of this construction includes a valve which is float actuated so as to allow for bypass to overflow channels when the top diffuser becomes clogged or otherwise cannot accommodate excessive flows of water.

In another embodiment, means are provided for drawing off samples of filtrate on which are performed tests for purity required by the various governmental agencies.

In another embodiment, means are provided for inoculating the filter medium with biodegrading microbes that consume the entrapped contaminants in the filter and thereby substantially restore the filter to its original condition as well as add beneficial microbes to the water to degrade target substances.

In another embodiment, the water passes through a settling chamber where sediment settles out before the water passes through the filter bags.

DESCRIPTION OF BEST MODES

Figure 1:
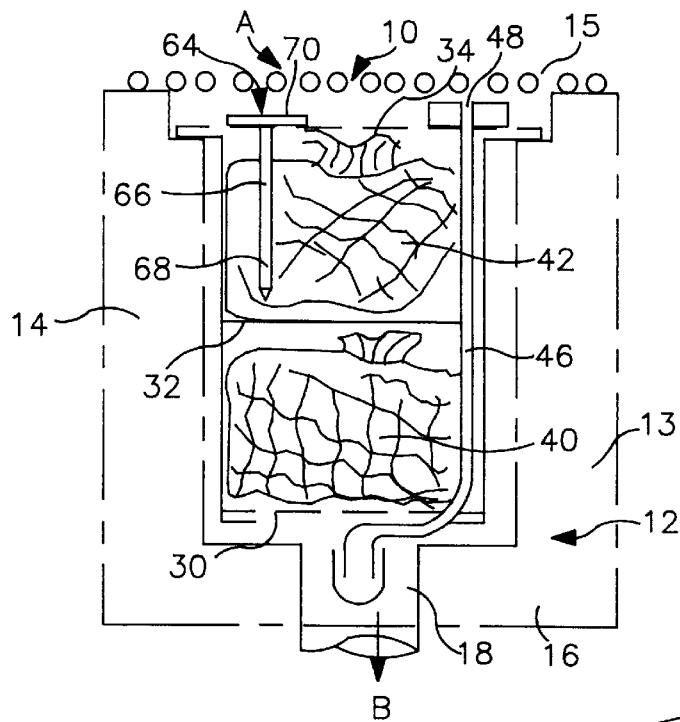
FIG. 1 is a sectional view of the assembled invention.
Figure 2:
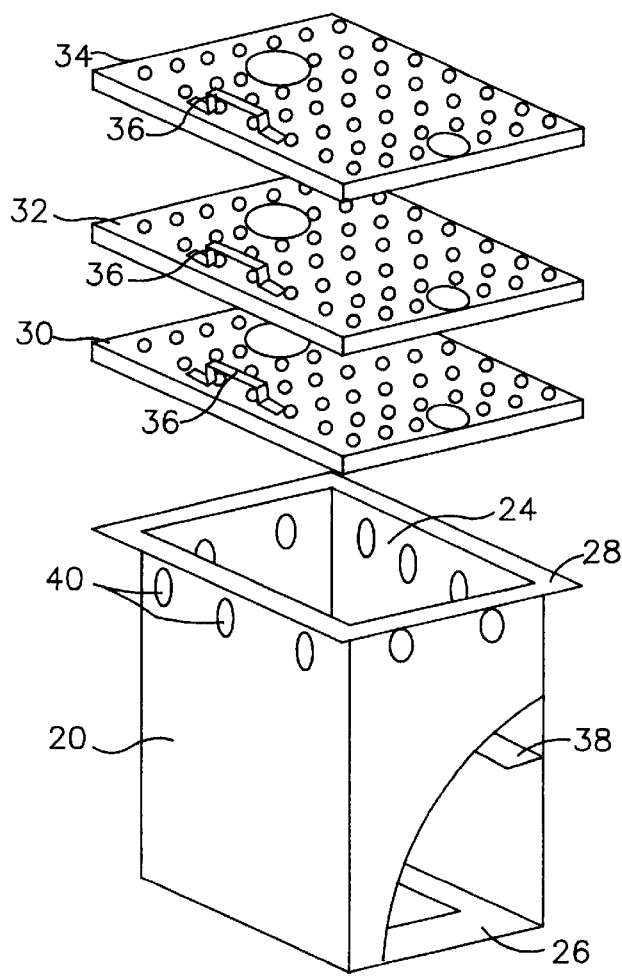
FIG. 2 is an exploded view of the housing.

Turning now to a discussion of the drawings, FIG. 1 is a sectional view showing the insert 10 of this invention positioned in a drain 12. The drain 12 is typically a cast concrete box 13 placed in the ground 14 with an upper edge supporting aa grate 15 at ground level and a closed lower end 16 with an opening 18 commnunicating with a sewer pipe or storm drain. FIG. 2 is an exploded view of the insert 10 showing a boxlike housing 20 with a bottom ledge 26 around an open bottom 22 and an open top 24 with outer ledge 28. Three diffuser plates (or screens) 30, 32, 34 are shown with an array of apertures in each diffuser plate and each diffuser plate having a handle 36. Diffuser plate 30 rests on bottom ledge 26. Diffuser plate 32 rests on intermediate ledge 38. Diffuser plate 34 rests on top ledge 28. Filter bag 40 is placed in the insert between the lower diffuser plate 30 and the intermediate plate 32. Filter bag 42 is placed inside the insert between intermediate diffuser plate 32 and top diffuser plate 34. The arrangement provides for very easily replacing spent filter media by simply lifting out the diffuser plate, removing the bagged filter media, installing the replacement bag, and reinstalling the diffuser plate.

Figure 6:
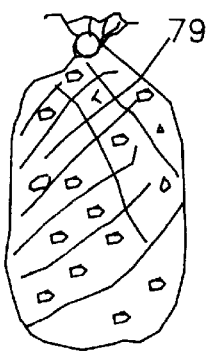
FIG. 6 Shows the bag of coarse weave and containing the filter medium.

Filter bags 40 and 42, shown also in FIG. 6 contain particulate filter material. The bags 40, 42 are formed from material having a very open structure or coarse weave so that contaminated or polluted water flows readily into the open top of the insert, through top diffuser plate 34, the filter medium in bag 42, the intermediate diffuser plate 32, the filter medium in bag 40, bottom diffuser plate 30 and out through the bottom of the filter into the sewer or drain pipe 18.

Filter media is selected according to the water condition. The water may contain more than one pollutant, one of which is effectively removable in one filter medium but which would poison (inhibit absorptive capability of) another filter medium intended to remove another pollutant. Therefore, it is an embodiment of this invention to arrange the bags in an order such that the water first passes through filter media formulated to remove the poisoning pollutant before the water is passed through the other filter media thereby ensuring removal of all pollutants. In many situations, an effective selection is fibrous cellulose particulate absorbent in bag 42 which abosrbs the majority of the hydrocarbon and similar organics; and specially textured activated carbon in the lower bag 40 to remove organically bound heavy metals, break-through hydrocarbons, and VOCs (volatile organic compounds). An appropriate fibrous cellulose particulate absorbent for this purpose is GRAY-SORB HO™ available from Bamcon Engineering, Castro Valley, Calif. Other selections include Redox cited previously, organic polymers, ion exchange and chelate resins obtainable from Rohm and Haas, Phila. Pa.

Drains for this type of application have a cross section ranging from 12×12 up to 48×48 inches. Although the required size of particulates of the filter medium and the mesh size of the bags may vary with conditions, we have found that a particulate size of 4 to 6 (Tyler mesh size) is preferred for the activated carbon and a bag of 20 mesh (U.S.) is preferred for the bag. Bags having a 10 mesh are preferred for Graysorb. Bags having 70 to 80 mesh are preferred for redox media.

FIG. 2 shows overflow holes 44 around the upper edge of the insert where overflow water can escape down the sewage sewer or storm drain.

Figure 3:
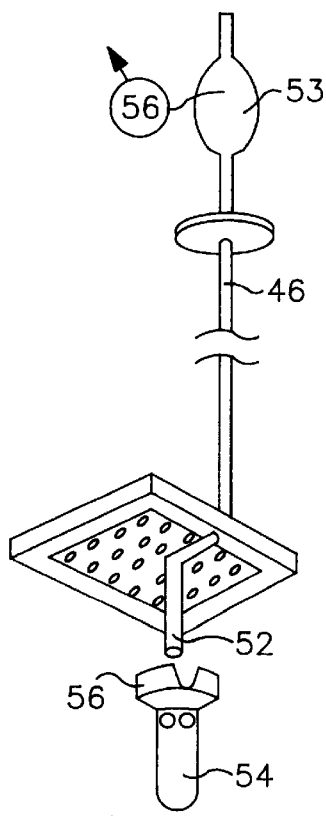
FIG. 3 shows details of the sampling mechanism.
Figure 4:
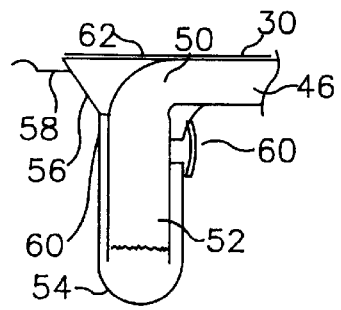
FIG. 4 shows the collection end of the sampling mechanism in detail.
Figure 5:
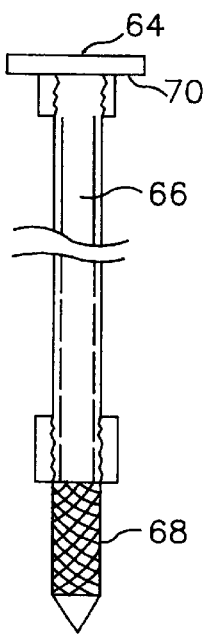
FIG. 5 shows an injection tube for injecting bioremedial microbes into filter medium.

Many municipal and government codes require that water passing through such drain systems be tested periodically. FIG. 1 shows an arrangement for periodically removing samples of water that has passed through the filter bags. FIGS. 3 and 4 show the arrangement in greater detail. There is shown a long tube 46 having an open end 48 coincident with the top diffuser plate 34 and a bottom end 50 extending to the middle of the bottom surface of bottom difuser plate 30 where an open bottom end 52 is inserted into cup 54. Cup 54 has a flared lip 56 which clips onto the bottom surface of diffuser plate 30. FIG. 4 shows a pair of valves 62 and 60 arranged such that water may be admitted from the insert through valve 62 such as to fill cup 54. When a vacuum is created in tube 46 using hand pump 56, the water in cup 54 is withdrawn into the hand pump 56.

FIGS. 1 and 6 also show an additional feature of the invention which provides for injecting bioremedial microbes into the filter media which consume absorbed hydrocarbons and thereby prolong the life of the filter media in bags 40 and 42. This is accomplished by injecting the microbes into the open end 64 of tube 66 whose other end has a tubular screen 68 screwed onto the main section of tube 66. The threaded connection of screen tube 68 to tube 66 permits detachment of the screen tube 68 for convenient flushing and cleaning when required. Cap 70 permits locating the end 64 of the tube coincident with the top diffuser plate 34. Any number of microbes can be considered for locating in the screen depending on various conditions of the contaminated or polluted water as in well known in the art and discussed in the BACKGROUND of this specification.

Figure 7:
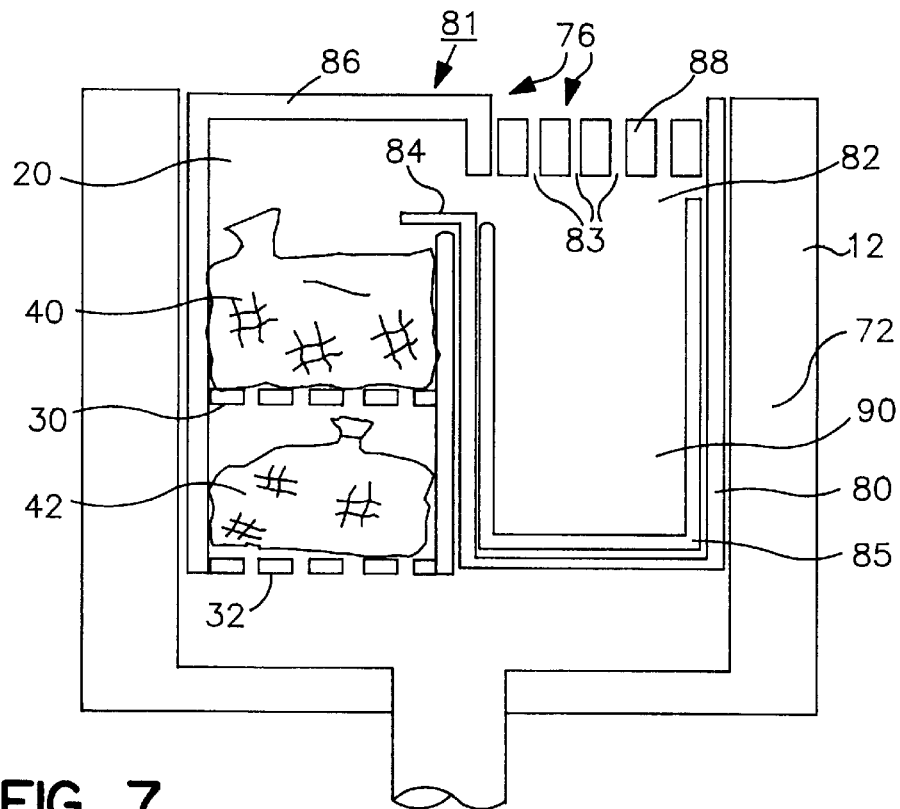
FIG. 7 is a sectional view of an insert with settling chamber.

FIG. 7 is a sectional view showing yet another embodiment of the invention having a feature for removing sediment from the storm water before the storm water passes through the bags of filter media. FIG. 7 shows a first housing 20 such as discussed in connection with FIG. 1 for containing bags 40 and 42 of filter media supported on diffuser plates 30 and 32. A second housing 80 is shown having an open top 82. Both housings, 20 and 80, are secured as with bolts to a pair of angle flanges 77 which are supported by shoulders (not shown) near the top of the concrete drain so that both housings are suspended side by side in the drain 12. A cover 81 is hingably attached to an upper lip of the housing 20 by hinges 89 and has two sections including a slanted runway section 86 and a vault grate 88 When the cover 81 is closed over the housings 20, 80, the cover 81 is substantially level with the surface of the top of the drain. The runway section 86 extends over the first housing 20 and the vault grate 88 extends over the second housing 80. The vault grate 88 has openings 83 such that all water accumulating in the vicinity of the drain passes through the vault grate 88 and into the chamber of settling housing 80. Sediment carried by water into the settling chamber 90 of housing 80 settles to the bottom of the settling chamber 90. When the settling chamber 90 becomes full of water, excess water flows across spillway 84 into the first housing 80 and thence through the filter bags 40, 42 as dicussed above.

The housing 80 may have a plastic liner 85 which collects the sediment and which may be withdrawn periodically to remove the sediment.

Figure 8:
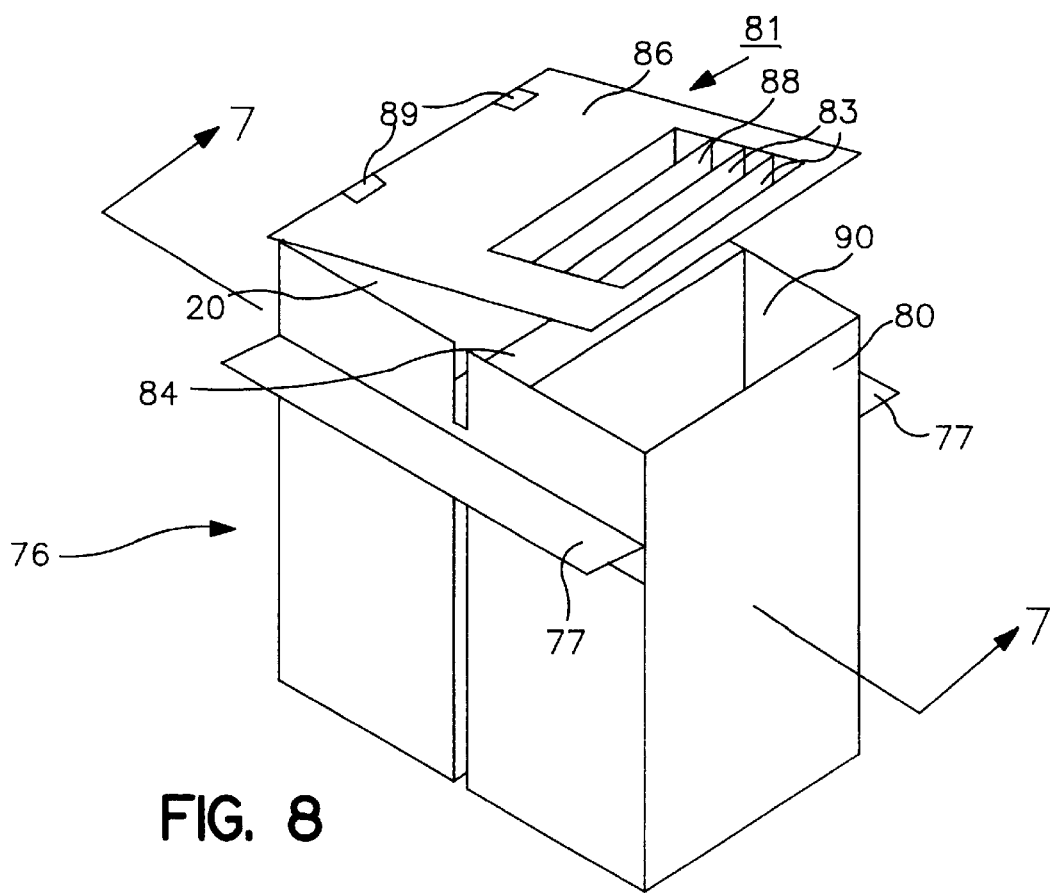
FIG. 8 is a perspective view of the insert of FIG. 7

The insert may be constructed such that filter housing 20 is separate from settling housing 80 as shown in FIG. 8 or housing 20 and housing 80 may share a common wall.

Figure 9:
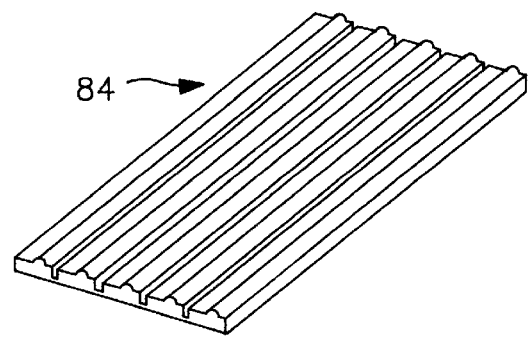
FIG. 9 is a perspective view of the spillway.

FIG. 9 shows a cross section of a preferred spillway having a surface with features such as ridges, dimples, slots or depressions which introduces turbulence into the water flow and promotes settling of the sediment.

Other variations of the embodiments discussed above may occur to the reader that are suggested by reading the specification and studying the drawings. For example, in some situations, it may be necessary to have more than two bags and compartments.

Such a situation may require a third bag for removing unbound heavy metals. It may not be necessary in some conditions to maintain the two bags separated by the intermediate diffuser 32. The housing may be cylindrical.

Figure 10:
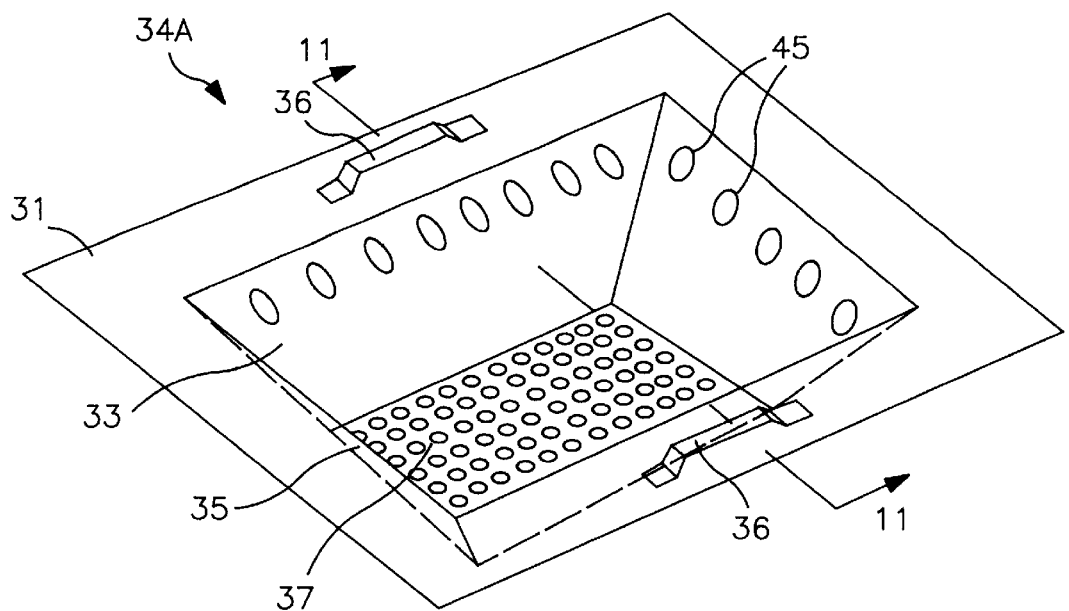
FIG. 10 shows a modified diffuser plate
Figure 11:
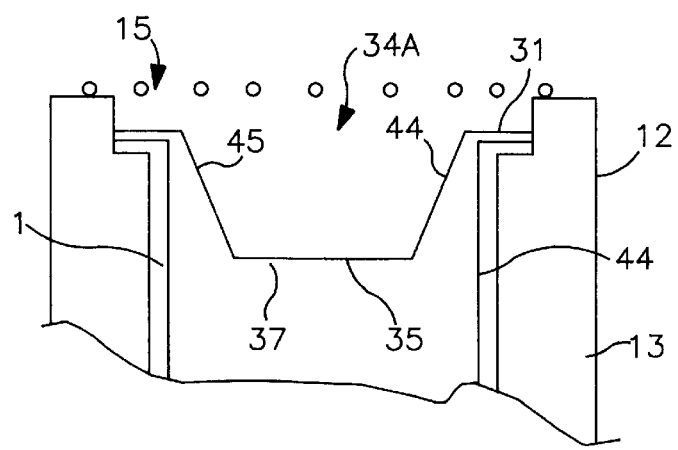
FIG. 11 is a sectional view of FIG. 10

FIGS. 10 and 11 show another embodiment of a top difuser plate 34A which is substituted for the top diffuser plate 34 shown in FIG. 1. Top diffuser plate member 34A has a frame 31, four slanted sides 33 with over flow holes 45, with an array of apertures 37. With diffuser plate member 34A in place as the top diffuser (replacing diffuser plate 34 shown in FIG. 1) then if apertures 37 become clogged with debria, the basin formed by slanted sides 33 will fill with water until excess water escapes through overflow holes 45. Water escaping through overflow holes 45 may still pass through filter bags 42 and 40.

The selection of filter media may include particulates or fibers (man-made or natural) In the context of this specification, particulate media include diatomaceous earth, vermiculites, heated and crushed perlite, crushed oyster shells. Natural fibers include cotton. Man-made fibers include polypropylene and nylon.

In view of these and other variations, we wish to define the scope of our invention by the appended claims.

We claim:

1. A method for removing contaminants from storm water passing into a storm drain, said drain having an open upper end, said method including the steps of:
   (a) placing an insert into said drain wherein said insert comprises:
      (i) a housing having walls which, when oriented to be substantially vertical, encloses a chamber with an open top end and open bottom end;
      (ii) a bottom diffuser plate with an array of apertures;
      (iii) means for supporting said bottom diffuser plate at said open bottom end of said housing such as to form a floor of said chamber;
      (iv) means adapted for supporting said insert inside said storm drain such that water entering an open upper end of said storm drain passes into said upper open end of said insert and out said bottom end of said housing through said bottom diffuser plate;
      (v) a plurality of bags, each bag of said plurality of bags containing a particulate filter medium of a plurality of filter media;
      (vi) each one bag of plurality of bags made from material having a mesh size and said particulates having a mesh size selected to permit flow of water through one side of said each one bag, through said filter medium and out through an opposite side of said each one bag without substantial accumulation of water in said insert when said each one bag is positioned in said insert and such that said particulate filter medium is retained in said each one bag when water flows through one side of said each one bag, through said filter medium and out an opposite side of said each one bag;

(vii) each one bag positioned in said chamber when said insert is suspended in said drain, to form a vertical stack of bags with a lowest bag supported on said bottom diffuser plate whereby water containing contaminants entering at a top end of said storm drain enters said top end of said insert, passes through each one bag, one after the other and hence through said bottom diffuser plate into a bottom end of said storm drain;

(b) permitting water to pass into said top end and out of said bottom end of said insert.

2. In a storm drain having a rim around an upper open end, the improvement comprising a filter insert for placement within said storm drain to remove a plurality of pollutants from storm water, said filter insert comprising:

a housing having substantially vertical walls defining a chamber with an open top end and an open bottom end;

a bottom diffuser plate having a plurality of apertures therethrough;

means for supporting said bottom diffuser plate at said open bottom end thereby forming a floor of said chamber;

a top diffuser plate having an array of apertures therethrough such that water entering said storm drain is diffused over an entire horizontal cross-sectional area of said chamber, said top diffuser plate being removably positioned over said open top end of said chamber;

means for supporting said insert inside said storm drain such that water entering the upper open end of said storm drain passes through said top diffuser plate into said open top end of said chamber and out through the bottom end and said bottom diffuser plate; and a plurality of bags, each bag containing at least a particulate filter medium or a fibrous filter medium, each of said filter media being capable of removing a pollutant selected from a group consisting of hydrocarbons, heavy metals, break-through hydrocarbons, and volatile organic compounds, each of said bags and said filter media having a mesh size which will not substantially impede the flow of water through the insert, each of said bags being positioned in said chamber in a vertical stack such that water flows through the bags sequentially, a lowest bag being supported by the bottom diffuser plate, said bags in said stack being arranged such that filter media which are capable of removing pollutants which would poison any pollutant sensitive filter media being used are situated above said sensitive filter media in the stack in order to remove the pollutant before it poisons said pollutant sensitive filter media.

3. The apparatus of claim 2 which comprises:

means adapted for withdrawing a sample of water that has passed into said top end of said chamber and out through said bottom diffuser plate.

4. The apparatus of claim 2 wherein said withdrawing means is an aspirator.

5. The apparatus of claim 2 wherein said means adapted for withdrawing comprises:

a sampling tube having one end positioned proximal to said top end of said chamber and another end positioned proximal to said bottom diffuser plate outside said insert;

a pump means for pumping said water sample attached to said one end of said sampling tube proximal to said top end of said chamber and accessible to a user;

a water basin positioned to catch water draining from said chamber through said bottom diffuser plate;

said sampling tube having another end positioned in said basin and arranged in operable combination with said basin such that air blown through said sampling tube by said aspirator expels water from said water basin such as to permit replacing water in said water basin and to permit drawing water into said aspirator.

6. The apparatus of claim 2 wherein said means for supporting said insert comprises a frame attached to said insert, said frame resting upon said storm drain rim with said insert being suspended therefrom with said open top end of said insert being substantially level with a surface defining the upper open end of said drain.

7. The apparatus of claim 2 wherein said housing has a plurality of overflow apertures in said sidewalls adjacent said top end.

8. The apparatus of claim 2 further comprising:

at least one additional diffuser plate; and means for removably supporting said at least one additional diffuser plate in said chamber parallel to said bottom diffuser plate and spaced therefrom, each said at least one additional diffuser plates being spaced from any neighboring diffuser plates and constructed and arranged to support said plurality of bags.

9. The apparatus of claim 2 wherein each bag of said plurality of bags is a fabric having an open weave.

10. The apparatus of claim 2 wherein each bag of said plurality of bags has mesh openings between a range of 10 to 80 mesh.

11. The apparatus of claim 2 wherein said filter medium in at least one of said plurality of bags is particulate cellulose.

12. The apparatus of claim 11 wherein a source of said particulate cellulose is wood pulp.

13. The apparatus of claim 11 wherein a source of said particulate cellulose is selected from a group consisting of rice hulls and corn husks.

14. The apparatus of claim 2 wherein said filter medium is selected from a group consisting of diatomaceous earth, vermiculites and heated, crushed perlite.

15. The apparatus of claim 2 wherein said filter medium in at least one of said plurality of bags is particulate activated carbon.

16. The apparatus of claim 15 wherein said particulate activated carbon has a particle size larger than 4 mesh and the mesh size of said bags range from 10 to 80 mesh.

17. The apparatus of claim 2 wherein said filter media in at least one of said plurality of bags is selected from a group consisting of redox media, ion exchange resin, chelating resin and organic polymers.

18. The apparatus of claim 2 further comprising means for innoculating said filter medium in at least one of said plurality of bags with a colony of bioremedial microbes.

19. The apparatus of claim 2 wherein said means for innoculating comprises:

an extension tube having an open first end and an open second end;

a screen tube having a closed end and an open end;

means for detachably attaching said open end of said screen tube to said first end of said extension tube and being constructed and arranged such that a matrix holding a bioremedial mass of microbes inserted through said open second end of said extension tube is capable of passing into said screen tube when said screen tube is attached to said extension tube; and means for attaching said exstension tube to said top diffuser plate proximal to said first end of said extension tube with said open second end of said extension tube detachably attached to said top diffuser plate and with said screen tube located in said filter medium in one of said plurality of bags, said open second end of said extension tube being proximal to an opening in said top diffuser plate such that said matrix containing said bioremedial mass of microbes can be inserted through said open second end of said extension tube and down into said screen tube to permit said microbes to migrate into said filter media in said plurality of bags.

* * * * *